July 14, 1964 — H. W. DIETERT — 3,140,751
BEAM BALANCE
Original Filed Aug. 21, 1961

INVENTOR.
HARRY W. DIETERT
BY Whittemore
Hulbert & Belknap
ATTORNEYS

_United States Patent Office_ 3,140,751
Patented July 14, 1964

3,140,751
BEAM BALANCE
Harry W. Dietert, Kerrville, Tex., assignor to Harry W. Dietert Co., Detroit, Mich., a corporation of Michigan
Original application Aug. 21, 1961, Ser. No. 132,902. Divided and this application Sept. 17, 1962, Ser. No. 224,000
5 Claims. (Cl. 177—247)

The invention relates to balances and refers more specifically to an improved beam balance including structure for direct reading of the moisture content of granular material and a method of use of the improved beam balance.

The application is a divisional application of Serial No. 132,902, filed August 21, 1961.

In the past the moisture content of granular material has often been determined by weighing a quantity of granular material, heating the quantity of granular material to remove the moisture therefrom, weighing the granular material from which the moisture has been removed and performing mathematical calculations to determine the percentage of moisture in the granular material using the results of the two weights of the granular material. Such procedure for determining the quantity of moisture in granular material is obviously time consuming and requires a number of steps and calculations which must be carefully carried out and provide chance for human error even with experienced personnel.

Where apparatus for direct reading of the moisture content of granular material has been provided in the past it has usually been complicated, expensive or inefficient.

It is therefore one of the purposes of the present invention to provide a beam balance including improved means for directly reading the moisture content of granular material.

Another object is to provide a method of use of a beam balance constructed as indicated above whereby improved direct reading of the moisture content of granular material is accomplished.

Another object is to provide a beam balance including a balance beam, a weight secured to one end thereof, means for receiving a quantity of granular material secured to the other end thereof, a scale supported by said balance beam extending substantially parallel thereof having graduations from zero to one hundred percent extending linearly thereover and a weight slidably movable along said scale equal to the weight secured to said one end of the balance beam.

Another object is to provide a beam balance as set forth above including a plurality of scales supported from the balance beam and having graduations thereon running from zero to a predetermined percentage of moisture content from the one end of the balance beam to the other end thereof and weights slidably positioned on each of said scales being one-half the percentage of the total of all of the weights as the highest percentage indicated on the respective scale.

Another object is to provide a method of use of a beam balance constructed as set forth above comprising moving one-half of the total of the weights to each end of the balance beam and positioning a known weight on the one end of the balance beam to exactly balance granular material placed in the means for receiving granular material at the other end of the balance beam.

Another object is to provide a method of use of a beam balance constructed as set forth above comprising placing all of the weights on the scales at the one end of the balance beam, placing sufficient granular material in the means for receiving granular material at the other end of the balance beam to balance the beam balance, drying the granular material positioned on the balance and re-balancing the balance with the dried granular material by moving one of the weights toward the other end of the balance beam and reading the percentage of moisture content of the granular material before drying directly from the scale along which the weight is moved.

Another object is to provide an improved beam balance including improved means for directly reading moisture content of granular material positioned thereon and a method of use of the improved beam balance so constructed which are simple, economical and efficient.

Other objects and features of the invention will become apparent as the description proceeds, especially when taken in conjunction with the accompanying drawings, illustrating a preferred embodiment of the invention, wherein.

With particular reference to the figures of the drawings one embodiment of the present invention will now be considered in detail.

Figure 1:
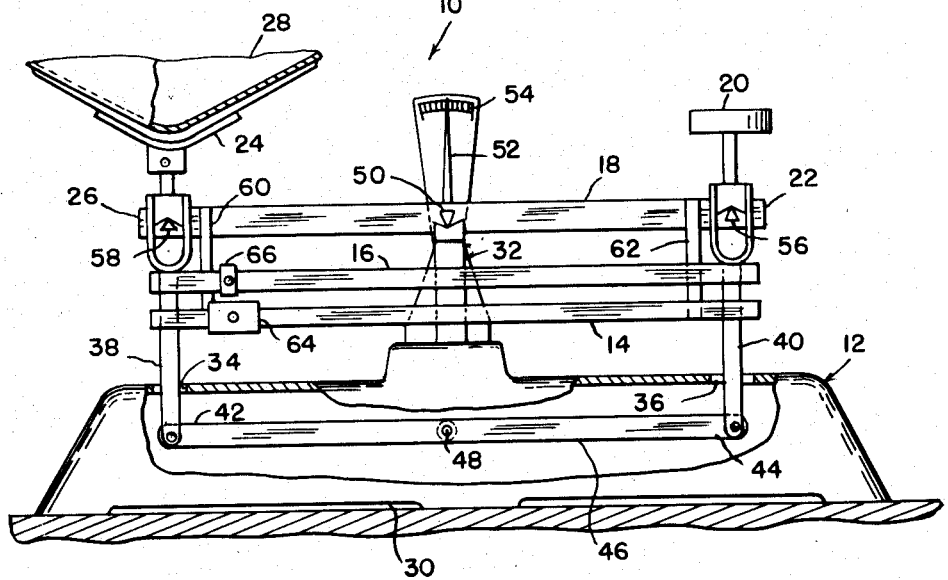
FIGURE 1 is an elevation view of a beam balance constructed in accordance with the invention.

The improved beam balance 10, as illustrated in FIGURE 1, includes the usual balance structure 12, scales 14 and 16 secured to the balance beam 18 of the balance structure 12. The weight 20 and the pan support 24 are also included as part of the beam balance 10.

In accordance with the invention the improved beam balance 10 provides a direct reading from one of the scales 14 and 16 of the moisture content of granular material positioned in pan 28 supported by the pan support 24. Further the beam balance 10 is so constructed that the exact weight of material positioned in pan 28 may be determined on balancing the material in pan 28 with known weight positioned on the weight 20.

More specifically the balance structure 12 includes the base 30 having the post 32 supported thereon and including openings 34 and 36 therein through which the vertical posts 38 and 40 extend. The posts 38 and 40 are pivotally connected at their lower ends to the ends 42 and 44, respectively, of the linkage 46 which is pivotally mounted on the base 30 by pivot means 48.

Balance beam 18 is pivotally mounted on post 32 by pivot means 50 and supports the indicator needle 52 centrally thereof. The indicator needle 52 is operable in conjunction with the fixed scale 54 to register balance of the balance beam 18 as will be understood by those in the art.

Weight 20 is secured to the post 40, as shown in FIGURE 1. Further post 40 and weight 20 secured thereto are pivotally secured to the end 22 of the balance beam 18 by the pivot means 56. Similarly the pan support 24 is secured to the post 38 while the post 38 and support 24 are pivotally secured to the end 26 of balance beam 18 by pivot means 58.

Scales 14 and 16, as shown best in FIGURE 1, are substantially parallel to and are rigidly secured to the balance beam 18 by means of the rigid straps 60 and 62 at the opposite ends thereof. Weights 64 and 66 are secured to the scales 14 and 16 for sliding movement therealong. Weight 64 in the embodiment of the invention shown in FIGURE 1 is equal to the combined weight of weights 20 and 66 while weight 66 is equal to two and one-half percent of the total of all of the weights 20, 64 and 66.

Figure 2:
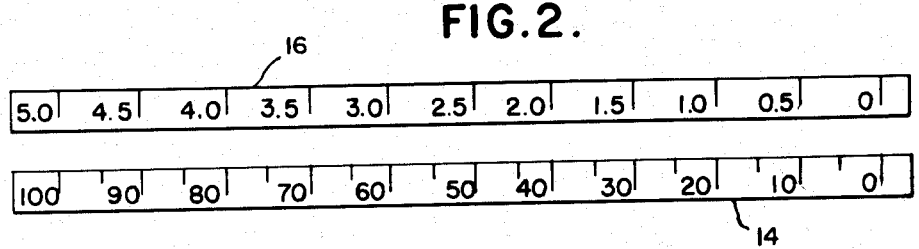
FIGURE 2 is an enlarged view of the scales provided on the beam balance illustrated in FIGURE 1.

Scales 14 and 16, as best shown in FIGURE 2, are provided with graduations extending from the end 22 of the balance beam to end 26 thereof which are spaced linearly therealong and provide a maximum indication of twice the percentage which the weight slidable along the particular scale is of the total of all of the weights. Thus the weight 64 is fifty percent of the total of the weights 20, 64 and 66 while the scale 14 has graduations spaced linearly therealong from zero to one hundred percent. In the same manner scale 16 has graduations from zero to five percent spaced linearly therealong from end 22 to end 26 of the balance beam 18 which percentage is twice the two and one-half percent which the weight 66 is of the total of the weights 64, 66 and 20.

In use when it is desired to read directly the moisture content of a sample of granular material the weights 66 and 64 are moved to the zero reading of the respective scales 14 and 16. Granular material is deposited in the pan 28 until the balance beam is exactly balanced as indicated by needle 52. The granular material is then heated to remove all moisture therefrom, after which one of the weights 64 or 66 is moved toward the end 26 of the balance beam 18 until the balance 10 is rebalanced. The exact percentage of moisture in the sample of granular material before it was dried may then be read from the scale supporting the weight moved to rebalance the balance beam 18.

The choice of the weights 64 and 66 to be moved to provide a direct reading of moisture content will depend on a first estimate of the moisture content of the granular material. If no estimate is available the proper weights 64 or 66 which should be moved along the scales 14 and 16 may be determined by trial and error.

In using the beam balance 10 to weigh specifically an amount of granular material positioned in the pan 28 the weight 66 is moved to the zero indication on the scale 16 while the weight 64 is moved to the one hundred percent indication on the scale 14. The material to be weighed is then positioned in the pan 28 and known weight is placed on the weight 20 until the balance beam 18 is in balance as indicated by the needle 52. The exact weight of the granular material in the pan 28 will then be the same as the known weight positioned on the weight 20 to balance the weight of material in the pan 28.

While one embodiment of the invention has been considered in detail other embodiments and modifications thereof are contemplated. It is therefore the intention to include all embodiments and modifications of the invention which are defined by the appended claims within the scope of the invention.

What I claim as my invention is:

1. A balance comprising a balance beam, pivotal mounting means centrally pivotally mounting the balance beam, a first weight fixedly positioned on one end of the balance beam, a first scale supported by the balance beam and extending from one end to the other thereof substantially parallel thereto having graduations thereon from zero to five spaced linearly from one end to the other thereof, a second weight positioned on said first scale for movement from one end to the other thereof past said pivotal mounting means of said balance beam, a second scale having graduations thereon from zero to one hundred spaced linearly from one end to the other thereof supported by the balance beam and extending from one end to the other thereof past said pivotal mounting means of said balance beam and substantially parallel to the balance beam and first scale, a third weight mounted on said second scale for movement linearly thereof past said pivotal mounting means for said balance beam from one end to the other of said scale, said second weight being equal to two and one-half percent of the total of all of said weights, said third weight being equal to fifty percent of the total of all of said weights and means for supporting a quantity of granular material equal in weight to the combined weight of all of said weights at the other end of the balance beam.

2. A balance comprising a balance beam, pivotal mounting means centrally pivotally mounting the balance beam, a first weight fixedly positioned on one end of the balance beam, a first scale supported by the balance beam and extending from one end to the other thereof substantially parallel thereto, a second weight positioned on said first scale for movement from one end to the other thereof past said pivotal mounting means of said balance beam, a second scale supported by the balance beam and extending from one end to the other thereof past said pivotal mounting means of said balance beam and substantially parallel to the balance beam and first scale, a third weight mounted on said second scale for movement linearly thereof past said pivotal mounting means for said balance beam from one end to the other of said scale and means for supporting a quantity of granular material equal in weight to the combined weight of all of said weights at the other end of the balance beam.

3. Structure as set forth in claim 2 wherein said second scale has graduations thereon from zero to one hundred spaced linearly from one end to the other thereof and said third weight equals fifty percent of the total of all of said weights.

4. Structure as set forth in claim 2 wherein said first scale has graduations thereon from zero to five spaced linearly from one end to the other thereof and said second weight is equal to two and one-half percent of the total of all of said weights.

5. A balance comprising a balance beam, pivotal mounting means centrally pivotally mounting the balance beam, a first weight fixedly positioned on one end of the balance beam, a scale having graduations thereon from zero to one hundred spaced linearly from one end to the other thereof supported by the balance beam and extending from one end to the other thereof past said pivotal mounting means of said balance beam and substantially parallel to the balance beam, a second weight mounted on said scale for movement linearly thereof past said pivotal mounting means for said balance beam from one end to the other of said scale, said second weight being equal to said first weight and means for supporting a quantity of granular material equal in weight to the combined weight of both of said first and second weights.

References Cited in the file of this patent

UNITED STATES PATENTS

| | | |
|---|---|---|
| 1,126,108 | Skogstad et al. | Jan. 26, 1915 |
| 1,141,202 | Munzner | June 1, 1915 |
| 2,667,064 | Anderson et al. | Jan. 26, 1954 |